United States Patent [19]

Boutaghou et al.

[11] Patent Number: 5,530,602
[45] Date of Patent: Jun. 25, 1996

[54] DISK DRIVE MICROMOTION STARTING APPARATUS AND METHOD

[75] Inventors: Zine-Eddine Boutaghou; Donald C. Buettner, both of Rochester; Thomas S. Larson, Altura, all of Minn.; Jaquelin K. Spong, San Jose, Calif.

[73] Assignee: International Business Machines Corporation, Armonk, N.Y.

[21] Appl. No.: 84,673

[22] Filed: Jun. 29, 1993

[51] Int. Cl.$^6$ ........................................ G11B 5/54
[52] U.S. Cl. .......................... 360/75; 360/73.03
[58] Field of Search ................ 360/75, 71, 69, 360/73.03, 78.05, 78.12, 78.13, 78.04, 102

[56] References Cited

U.S. PATENT DOCUMENTS

| | | |
|---|---|---|
| 4,530,021 | 7/1985 | Cameron ......................... 360/75 X |
| 4,589,036 | 5/1986 | Bertschy et al. ................. 360/75 |
| 4,970,610 | 11/1990 | Knappe .......................... 360/75 |
| 5,018,029 | 5/1991 | Ekhoff et al. ................... 360/69 |
| 5,117,315 | 5/1992 | Nagasaki et al. ................ 360/75 X |
| 5,235,264 | 8/1993 | Kaneda et al. .................. 318/727 |
| 5,276,569 | 1/1994 | Even ............................. 360/75 X |
| 5,315,455 | 5/1994 | Ito ............................... 360/75 |
| 5,397,971 | 3/1995 | McAllister et al. .............. 360/75 X |

FOREIGN PATENT DOCUMENTS

| | | | |
|---|---|---|---|
| 58-01858 | 1/1983 | Japan . | |
| 58-1858 | 1/1983 | Japan ............................ | 360/75 A |
| 59-177762 | 10/1984 | Japan ............................ | 360/75 A |
| 63-14374 | 1/1988 | Japan ............................ | 360/73.03 |

OTHER PUBLICATIONS

"Start–Up Assist by Resonant Actuator Displacement", 32936s Research Disclosure Sep. 1991.
IBM Technical Disclosure Bulletin, "Magnetic Recording File With Data Recovery Capability And A High Start Torque Spindle Driver", vol. 31, No. 12, May 1989, pp. 40–41.
IBM Technical Disclosure Bulletin, "Start/Stop Life Enhancement By Actuator Preload", vol. 21, No. 12, May 1979, p. 4992.
IBM Technical Disclosure Bulletin, "Hard Disk Drive Spindle Motor Excitation Function", S. Yamamoto, vol. 32, No. 3B, Aug. 1989, pp. 40–41.
"The Dependence of Stiction and Friction on roughness in thin–film magnetic recording disks", V. Raman et al., Jour Appl Phys., 70 (3), 1 Aug. 1991, pp. 1826–1836.
IBM Technical Disclosure Bulletin, "Displacement Amplification", D. H. Malueg et al., vol. 32, No. 6A, Nov. 1989, p. 121.

*Primary Examiner*—Aristotelis Psitos
*Assistant Examiner*—James L. Habermehl
*Attorney, Agent, or Firm*—Robert W. Lahtinen; Roy W. Truelson; Matthew J. Bussan

[57] ABSTRACT

A starting sequence is provided for a rotating disk data storage device by providing a low level sensing current to the spindle motor which is able to initiate rotation of the disk spindle assembly when, absent stiction between head and confronting disk surface, it is only necessary to overcome disk assembly inertia and head drag. A sensing device is provided to sense a back electromotive force (EMF) in the spindle motor windings which indicates the start of disk rotation when any stiction condition has been terminated. A sequence of alternating current pulse bursts are applied to the actuator motor to impart a dithering action to the heads which induces axial vibration of the disks to break the stiction between the heads and confronting disk surfaces. The initial burst is of low amplitude pulses and each succeeding burst is of progressively greater amplitude and the pulses of each burst are of constant or progressively varying frequency to afford some consecutive pulses approaching the resonant frequency of the disk modes of vibration to enhance the stiction breaking force. The sensing of a back EMF (indicating disk rotation and the termination of any stuck head condition) is used to terminate the start sequence and switch the spindle and actuator motors to the normal operational control of the drive.

10 Claims, 7 Drawing Sheets

584 Hz

555 Hz

697 Hz

1132 Hz

1072 Hz

1351 Hz

DISK DRIVE MICROMOTION STARTING APPARATUS AND METHOD

BACKGROUND OF THE INVENTION

This invention relates to disk drives of the type in which a transducer carrying head rests on the disk surface when the disk is at rest and is supported on a film of fluid above the disk surface when the disk is rotating during operation. More particularly the invention is directed to the starting of disk operation when one or more of the transducer carrying heads may be adhered or stuck to the disk surface against which it rests when the drive is not operating.

A most common cause of disk drive failure is stiction, the adhesion of the transducer carrying head to disk surface upon which it rests when the drive is not operating. This occurs during the period between manufacture and initial operation and any prolonged periods between disk operation. The adhesion is a natural result induced by the ultra smooth surface finishes of both the slider air bearing surface and the disk recording surface upon which it rests. The stiction condition is made more severe by the presence of lubricant applied to the disk surface or contaminants that deposit on the disk surfaces whether or not a lubricant is used. The stiction problem is also aggravated as ever smoother surface finishes are provided on both the disk data surface and the head air bearing surfaces to enable the head to fly at only a few microinches above the disk and achieve higher linear storage densities. Simultaneously, the design objective is to reduce the size, weight and power consumption of the motor used to rotate the disk spindle assembly.

Various approaches have been used to overcome the stiction problem. A disk may be provided with a rougher surface in the zone where the head lands and is parked during periods of nonuse of the drive. U.S. Pat. No. 5,018,029 uses a solenoid to apply a shock force to the spindle to degrade the stiction at the time of starting.

U.S. Pat. No. 4,970,610 teaches the pulsing of the current supplied to the spindle motor at start at a frequency near the resonant frequency of the stuck system. This rapidly amplifies the torque such that the number of pulses in the sequence must be limited to prevent damage to the heads or suspensions. However, the pulse frequency and sequence are directed to the resonant frequency of a fully stuck system where all heads are adhered to the confronting disk surfaces and amplification is rapidly diminished as the applied pulse frequency departs from the resonant frequency in the environment where the stuck condition involves a few or less than all heads.

An effective way to apply a force to the stuck interface is through use of the voice coil motor that drives the actuator to move the head assembly from track to track and to maintain a selected head in alignment with an addressed track. The voice coil motor can apply greater torque since the objective of the actuator motor design is to have the greatest available torque available within the size and power restraints and the ability to limit any stray magnetic field that might interfere with other magnetic systems within the device.

U.S. Pat. No. 4,530,021 teaches the pulsing of the current to the voice coil motor to apply a short oscillatory force to the heads prior to the start of rotation. This technique may apply a torque of sufficient magnitude to damage the head-suspension gimbal support structure. U.S. Pat. No. 4,589,036 teaches the application of a current to the voice coil motor that would induce a constant velocity radial motion of the actuator assembly. When a back EMF is sensed, indicating a predetermined motion of the head assembly, the spindle motor is activated.

SUMMARY OF THE INVENTION

The apparatus and technique of the present invention starts a disk drive by initiating a sensing current level to the spindle motor simultaneously with the beginning of the starting current sequence applied to the actuator voice coil motor. The sensing current is of a magnitude that will start spindle rotation if it is only necessary to overcome the drag force of the heads resting against the disk surfaces. The starting current sequence associated with the actuator voice coil motor is a series of alternating current bursts, beginning with the lowest amplitude burst. Each succeeding current burst is of increased amplitude. Imparting a vibratory action to the stuck head induces a vibratory action to the disk in the axial direction which is at right angles to the direction of head vibration. During each burst, the pulse frequency is varied progressively through a range of values. The range of selected frequencies applied to the stuck head is selected to enable the frequency of some of the burst pulses to approach the resonant frequency of on or more modes of disk vibration.

A sensor connected to the spindle motor coils responds to the presence of a back EMF, indicating that the heads are no longer adhered to the disk surfaces and rotation has begun, to terminate the voice coil motor starting sequence and place the spindle and actuator motor under normal operating control.

DETAILED DESCRIPTION OF THE INVENTION

Figure 1:
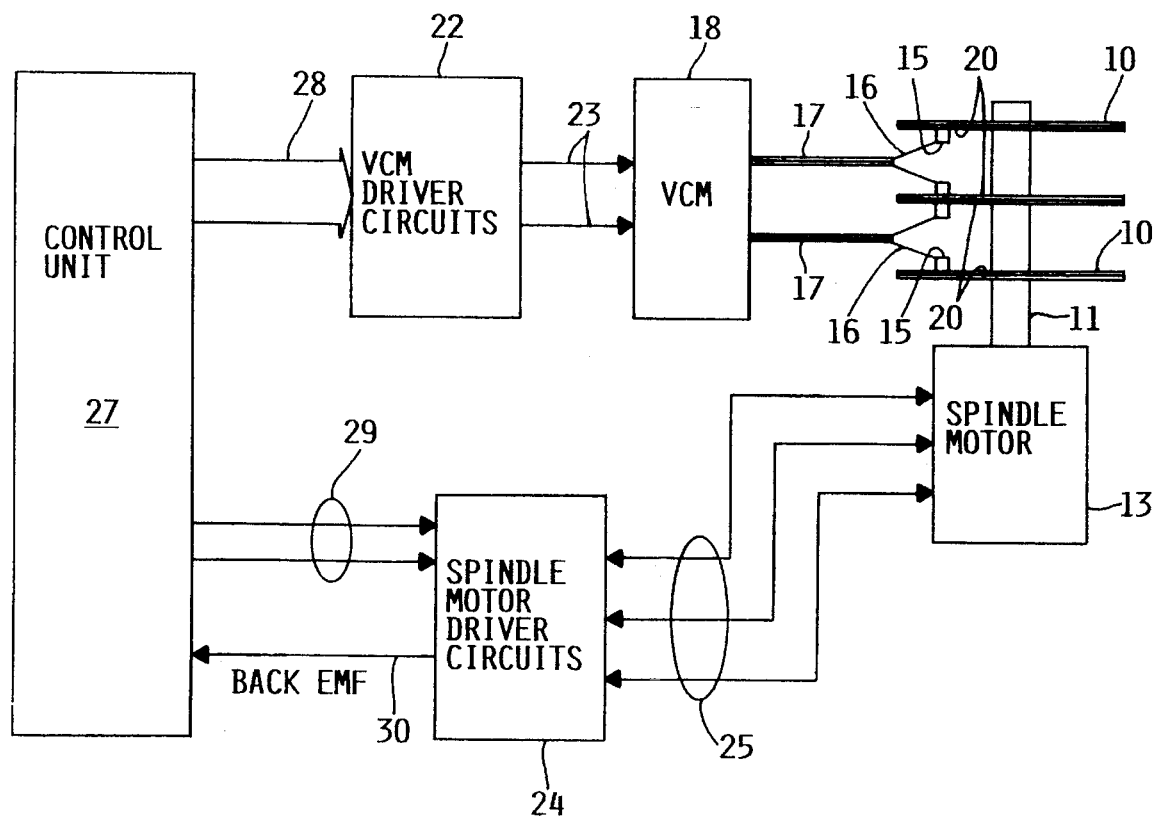
FIG. 1 is a partial block diagram of a typical disk storage device incorporating the present invention.

FIG. 1 shows portions of a typical rigid disk magnetic storage device which incorporates the present invention. The disks 10 are supported on a shaft 11 as a unitary assembly that is rotated by a spindle motor 13. A plurality of transducer carrying heads 15 are respectively supported on suspensions 16 which are carried by actuator arms 17 with the actuator assembly being driven by a voice coil motor 18. The actuator functions to move heads 15 from one concentric track to another concentric track on the respectively confronting surfaces of disks 10 and to maintain the transducer in alignment with an addressed track during read and write operations even if the track may have become elliptical, requiring numerous position corrections during each rotation of the disks.

When the drive is not being operated, the disks 10 are not rotated and the biasing force of suspensions 16 causes the heads 15 to rest on the respectively confronting disk surfaces 20. When the disk drive is operating with the disks rotating at the operational rotational velocity, normally 3600 RPM or above, the head flies on a film of fluid that separates head 15 and disk surface 20 by a few millionths of an inch. Currently, the fluid film is most commonly air which maintains a head air bearing surface spaced from the confronting disk surface during operation. However, some devices use a liquid lubricant film which is stiffer and enables an even smaller separation between head and disk storage surface.

The voice coil motor 18 is energized by the voice coil motor driver circuits 22 which deliver a current on lines 23 in one direction to pivot the head arm assembly radially outward and in the opposite direction to cause the head arm assembly to move radially inward. The spindle motor driver circuits 24 control the current flow on lines 25 to rotate the spindle motor armature (and consequently the disk spindle assembly attached thereto) at a constant rotational speed during drive operation. Motor 13 is most commonly a brushless DC motor with three windings or three sets of windings.

A control unit 27 includes the microcode which controls the starting procedure of the present invention and exercises control of the spindle motor 13 and voice coil motor 18 during the start sequence by signals on the control bus 28 to the voice coil motor driver circuits 22 and the control lines 29 to the spindle motor driver circuits 24. Also used is a back EMF signal on line 30 which is active when rotation of the disk assembly occurs.

Figure 2A:
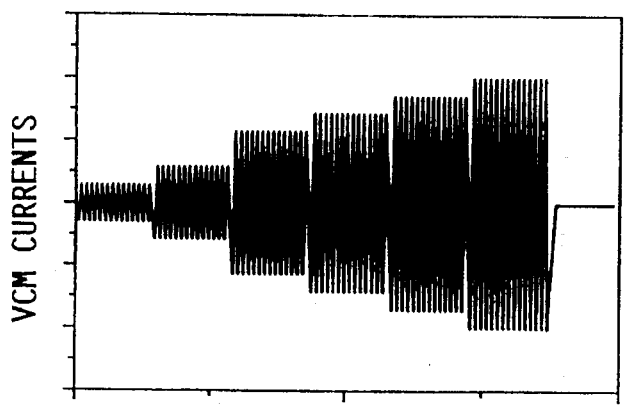
FIGS. 2A–2C are a series of graphs illustrating current conditions at corresponding times in the device spindle motor and actuator voice coil motor.
Figure 2B:
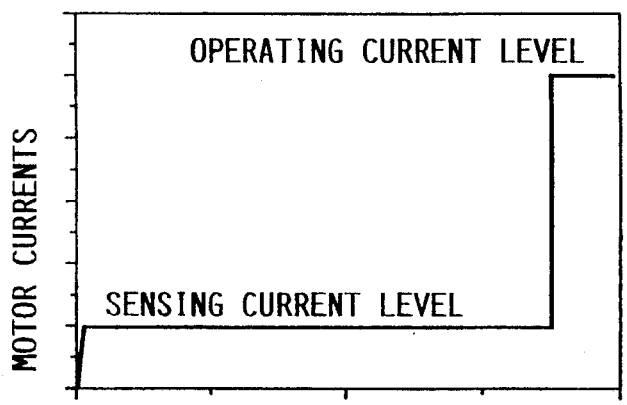
Figure 2C:
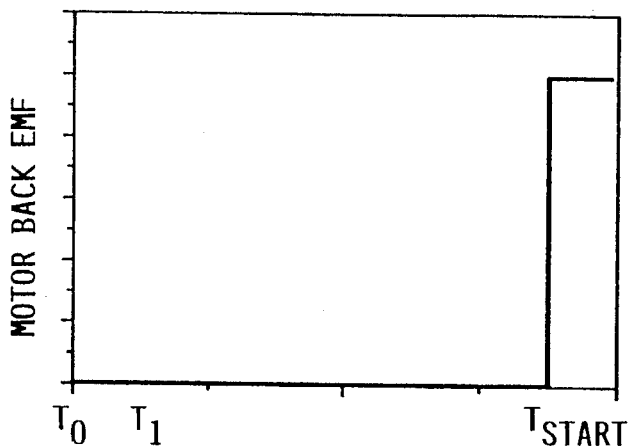

FIGS. 2A, 2B and 2C respectively illustrate the corresponding sequence of voice coil motor current, spindle motor current and the sensed back EMF. The current supplied to the voice coil motor at start is a series of six bursts as shown if the full sequence is utilized under microprocessor control. The initial burst is of lowest amplitude and includes a series of alternating pulses of a constant frequency or a varying frequency which begins with the lowest frequency and increases frequency during the burst. The alternating pulses provide a dithering motion of the head-suspension assembly which induces a vibratory motion in the disk that is effective to break the adhesion between head and disk. The variable frequency enhances the stiction breaking action causing the stuck head dithering action to approach the resonant frequency of one or more modes of disk vibration. In an environment where the resonant frequency of two modes of vibration are near one another, it is possible to use a constant pulse frequency that excites both modes of vibration simultaneously.

The pulse burst sequence illustrated in the graph of FIG. 2A can be controlled by the use of microcode in the device control system. The microcode is used to switch electronics which determine the pulse amplitude and the oscillator output provides the signals which enable the initiation of each of the pulses within the burst. Control of the pulse initiation makes possible either an even spacing between pulses to give a constant frequency burst or a variation of the periods between pulses to vary the pulse frequency to achieve the described use of resonant frequencies for multiple modes of disk vibration.

As shown in FIG. 2A, there are six bursts of progressively increasing current amplitude. Simultaneous with the initiation of the start sequence, a sensing current level (FIG. 2B) is applied to the spindle motor. The sensing current level is a current amplitude which will cause the spindle assembly to rotate under conditions where it is only necessary to overcome the rotational inertia of the spindle assembly and the drag of the head resting on the disk surfaces without stiction. FIG. 2C shows sensing of the back EMF in the spindle motor windings as rotation of the disk-spindle assembly occurs. When a back EMF is sensed, the start sequence is terminated and spindle motor and voice coil motor control is transferred to the normal motor operational control functions. As shown in FIG. 2C, a back EMF is illustrated as occurring at the end of the voice coil motor pulse burst sequence. However, the back EMF may occur at any time during the voice coil motor pulse burst sequence and at that time during the start sequence the pulse bursts are discontinued and the operating current applied to the spindle motor windings. If no stiction exists, the sensing level current will initiate spindle assembly as soon as applied and the stiction breaking start sequence will be aborted immediately and the operating current level applied to accelerate the spindle assembly to the regulated operating rotational velocity.

The use of the presence of a back EMF to sense the rotation of the spindle motor and the disks that rotate in unison with the motor armature, is an exemplary use of a condition that exists and is useful for this purpose. It would also be possible to use any other instrumentality that is present or may be introduced for sensing spindle motion. Other acceptable devices would include Hall sensors, shaft encoding or the use of data recorded on the disk for the detection of spindle motion or speed control.

Figure 3:
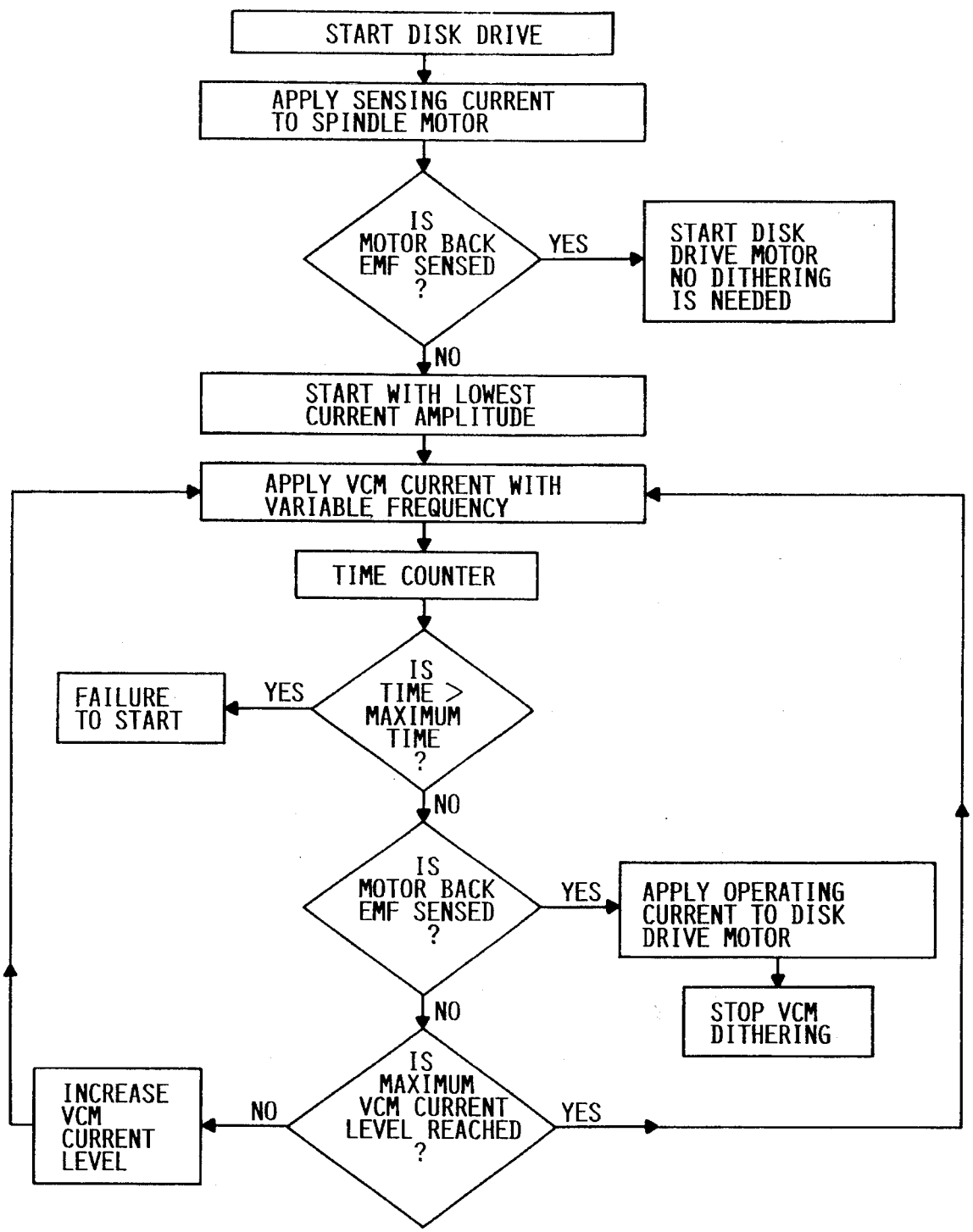
FIG. 3 is a flow diagram show the sequence of events of the present invention.

The flow diagram of FIG. 3 illustrates the disk drive micromotion start sequence motor control of the present invention. The disk drive start command initiates the application of sensing current to the spindle motor windings. If a back EMF is immediately sensed, showing that the spindle assembly has started to rotate, the start sequence is stopped prior to application of the first burst of alternating pulses to the voice coil motor and the operating current is applied to the spindle motor. If no back EMF is sensed, the alternating pulse burst sequence is begun starting with the lowest amplitude burst applied with variable frequency. A time counter accumulates the total time of the start sequence and if the current total is less than the maximum time duration for the start sequence, a test is made for the presence of a back EMF which if present terminates the start sequence and initiates operational control and if not present, allows the start sequence to proceed. If the maximum voice coil motor current level has not been reached, the voice coil motor current level is increased to the next amplitude value and another alternating constant or variable frequency current pulse burst applied. If the current level is at the maximum, the next pulse burst is applied without increasing the current amplitude. The sequence continues until a back EMF shows that stiction has been broken or a maximum time for the start sequence has elapsed whereupon the start sequence is stopped and a failure to start error is posted.

Figure 4A:
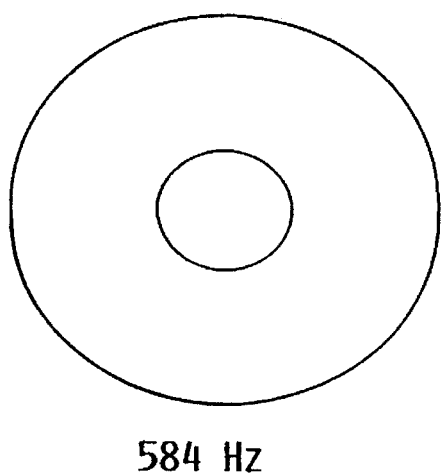
FIGS. 4A–4C show the modes of disk vibration and resonant frequencies for a typical 3½ in disk drive.
Figure 4B:
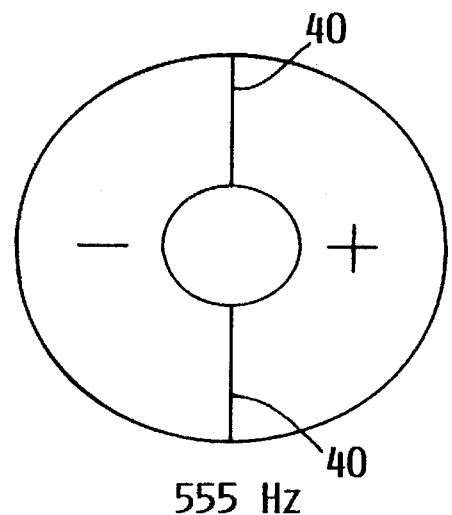
Figure 4C:
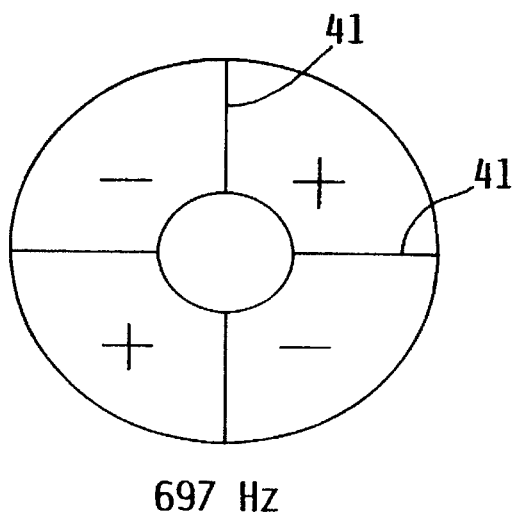

FIGS. 4A–4C illustrate an example of a 3½ inch disk drive having 0.8 millimeter thickness disks which are retained by a 100 pound clamping force. The figure shows the resonant disk vibration frequencies of the drive of the example. FIG. 4A shows a first mode of vibration, the umbrella type where the periphery vibrates in unison in the axial directions with a resonant frequency of 584 Hz. In FIG. 4B the disk vibrates by halves in opposite axial directions about the node lines 40 with a resonant frequency of 555 Hz. The third mode of vibration is illustrated in FIG. 4C wherein the disk vibrates by quadrants about the node lines 41, with the quadrants included within vertical angles moving in the same axial direction and having a resonant frequency of 697 Hz. The mode of FIG. 4A has the greatest amplitude of vibratory motion, while the amplitudes of modes of FIG. 4B and FIG. 4C are progressively smaller. By exciting each principal resonant disk frequency or by varying the frequency of each pulse burst from 550 to 700 Hz the disk vibration frequency encompasses the resonant frequency of each mode of vibration shown in FIGS. 4A–4C.

Figure 5:
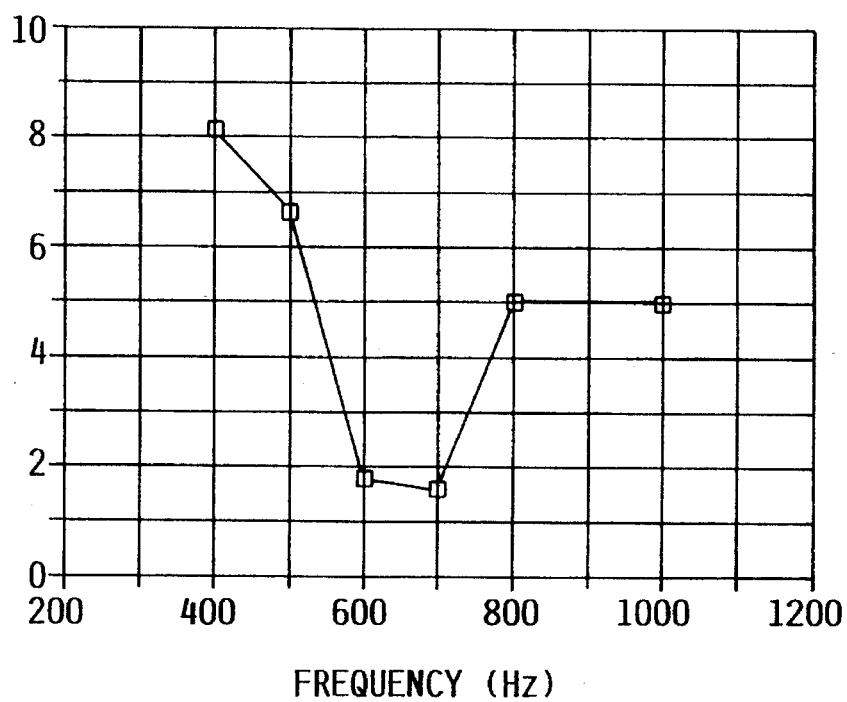
FIG. 5 illustrates the power required to overcome head-disk stiction, in a device with sixteen head/disk interfaces having 20 grams stiction per head/disk interface, at various pulse frequencies in the drive of FIGS. 4A–4C.

The graph of FIG. 5 indicates the power required to free the stuck heads of the 3½ drive of the example described above at a progression of frequencies from 400 Hz to 1000 Hz. The head stiction can be eliminated by supplying only 2 watts of power to the actuator motor when the frequency of the applied current pulses is in the range of resonance for the principal modes of vibration. The power requirement is significantly higher at other frequencies.

Figure 6A:
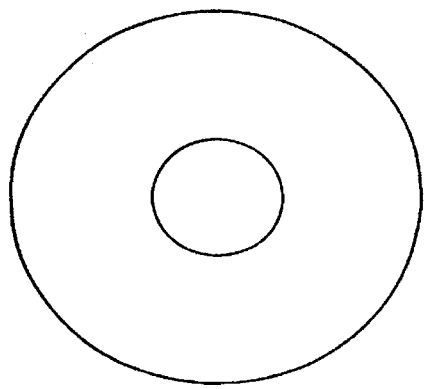
FIGS. 6A–6C are similar to FIGS. 4A–4C showing the vibration modes and resonant frequencies for a typical 2½ inch disk drive.
Figure 6B:
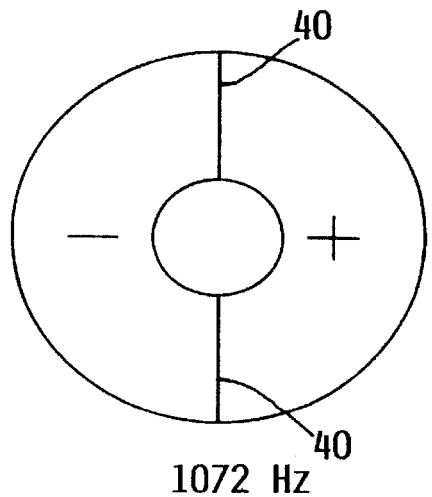
Figure 6C:
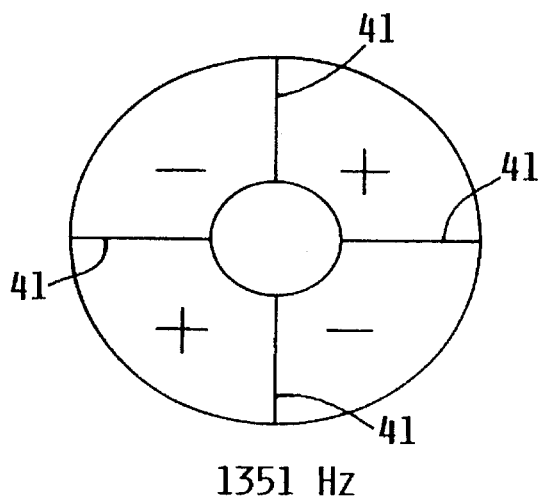

FIGS. 6A–6C are directed to an example wherein a disk drive uses 0.8 millimeter thickness, 2½ inch diameter disks secured by a 10 pound clamping force. FIGS. 6A–6C respectively show the three modes of vibration illustrated in FIGS. 4A–4C; umbrella mode at FIG. 6A, dual mode about node lines 40 in FIG. 6B and the quad mode about node lines 41 in FIG. 6C. The respective resonant frequencies are umbrella mode 1132 Hz, dual mode 1072 Hz and quad mode 1351 Hz.

Figure 7:
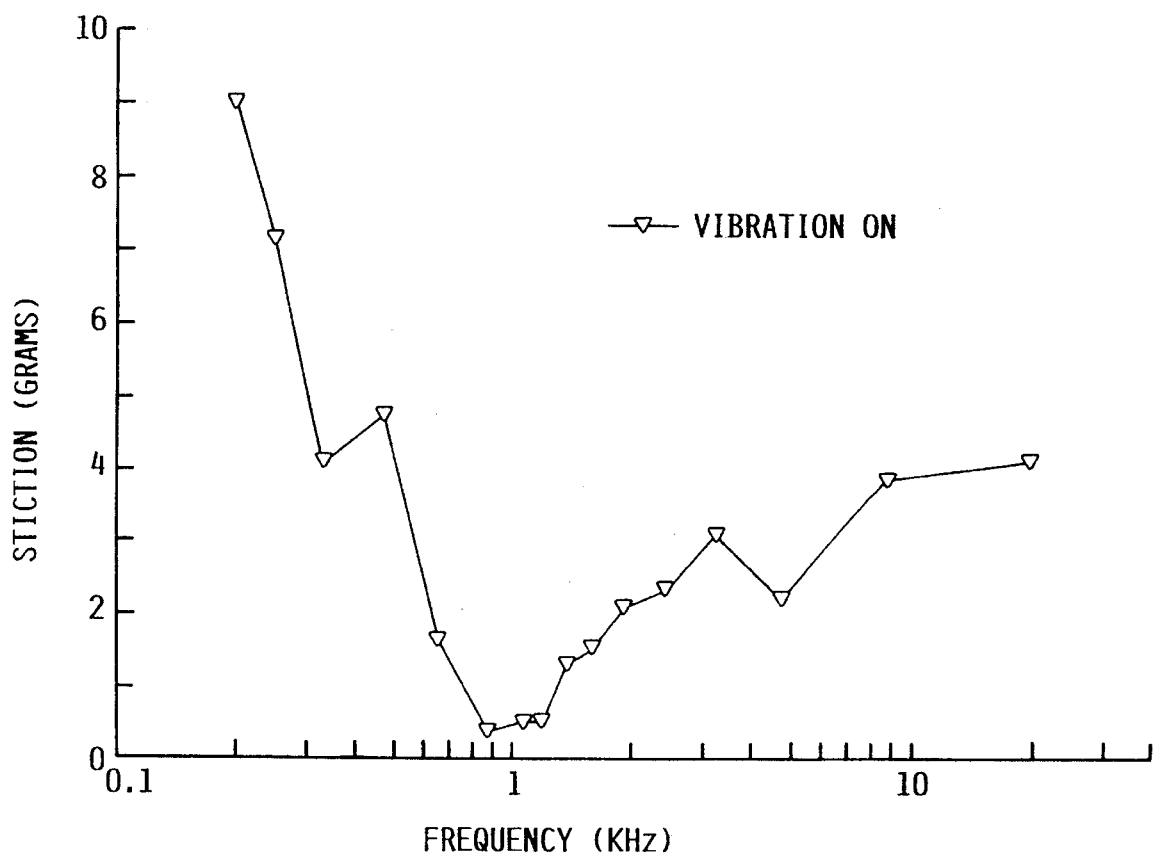
FIG. 7 is a graph showing the stiction for one head/disk interface at varying pulse frequencies in the disk drive of FIGS. 6A–6C.

FIG. 7 shows the power required at various disk vibration frequencies to free stuck heads. In the 2½ inch disk drive of the example, the resonant frequencies can be utilized by exciting the principal disk resonant frequencies or by using the range of frequencies of 985 Hz to 1140 Hz within the pulse bursts. Although the pulse burst variable frequency range indicated does not include the 1351 Hz resonant frequency of the quad mode, the narrower range is selected as being more effective to optimize the energizing of the single and dual vibratory modes. To include the quad mode in this example would substantially extend the range of frequencies of each pulse burst to include the mode of vibration having the lowest amplitude and least stiction breaking capability.

It will be observed that the frequency range is selected in a narrow band of frequencies despite the fact that various device tolerances cause variations in the resonant frequency of the various modes. Variations in disk thickness, disk diameters, disk alloy and clamping force all affect the resonant frequencies. However, disk drives are very high precision low tolerance devices with disk of very uniform diameters which are superfinished to microinch dimensions and secured using closely controlled clamping forces. Therefore, it is reasonable to assume that in this high precision environment any variation in disk resonant frequencies will be minimal.

While a preferred embodiment has been show and described in detail, it should be apparent that changes and modifications to the embodiment will occur to those skilled in the art without departing from the spirit and scope of the invention as set for in the following claims.

We claim:

1. In a disk drive having at least one rotatable storage disk, a disk drive motor connected for rotation of said at least one disk, a radially movable actuator driven by an actuator motor and a plurality of read write heads attached to the actuator, wherein said actuator is a voice coil motor and wherein said heads include bearing surfaces that are supported on a film of fluid above the disk surface when the disk is rotating at its operating speed and are in contact with the surface of the disk when the disk is at rest, comprising first current supply means for delivering a first low level current to said drive motor which is sufficient to overcome drag and rotate said at least one disk when no head is adhered to the confronting disk surface;

actuator current supply means for energizing said actuator motor with an initial low level burst of alternating current pulses and a subsequent higher level burst of alternating current pulses, each pulse burst including a series of alternating current pulses, wherein said actuator current supply means comprises a sequence of bursts of alternating current pulses initially of low amplitude with progressively increased amplitudes used during each succeeding pulse burst, and wherein said actuator current supply means applies alternating current pulses of varying frequency during each burst of pulses;

sensing means for sensing rotation of said at least one disk; and control means, responsive to said sensing means sensing rotation of said at least one disk, for terminating said actuator current supply means and said first current supply means.

2. The disk drive of claim 1 wherein the frequency of current pulses is progressively changed during each of the pulse bursts.

3. A method for starting disk rotation of a disk drive data storage device which has a rotatable data storage disk driven by a spindle motor; a transducer carrying head for reading data from and writing data on the disk; and an actuator, driven by an actuator motor, attached to the head for moving the head over the disk surface; wherein the head is in contact with the disk surface when the disk is at rest and rides on a bearing of fluid which separates the head and disk when the disk rotates at its operational speed comprising the steps of applying a low level sensing current to the spindle motor which is sufficient to overcome disk inertia and head drag if stiction is not present;

sensing the presence or absence of back electromotive force in the spindle motor wherein the presence of a back electromotive force indicates disk rotation has begun;

applying a sequence of bursts of alternating current pulses to the actuator motor with the initial burst being of a low amplitude with subsequent bursts of greater amplitude responsive to the sensing of the absence of a back electromotive force, each pulse burst including a series of alternating current pulses, wherein the sequence of bursts of alternating current pulses begins with the lowest amplitude burst with successive bursts being of progressively increasing amplitude, and wherein the pulses of each burst are of varying frequency; and switching the actuator motor and spindle motor from start sequence control to operational control responsive to the sensing of the presence of a back electromotive force by terminating the burst sequence to the actuator motor and the low level sensing current to the spindle motor.

4. The method according to claim 3 wherein the pulses within each burst of pulses are of progressively increasing frequency.

5. A method for starting disk rotation of a disk drive data storage device which has a rotatable data storage disk driven by a spindle motor; a transducer carrying head for reading data from and writing data on the disk; and an actuator, driven by a voice coil motor, attached to the head for moving the head over the disk surface; wherein the head is in contact with the disk surface when the disk is at rest and rides on a bearing of fluid which separates the head and disk when the disk rotates at its operational speed comprising the steps of applying a series of bursts of alternating current pulses to the actuator voice coil motor to induce disk vibration with the first pulse burst being of the lowest amplitude and subsequent alternating pulse bursts being of progressively increasing amplitude, each pulse burst including a series of alternating current pulses, wherein the step of applying a series of bursts of alternating current pulses comprises the application of a varying frequency of pulses within each burst;

sensing for the start of disk rotation; and upon sensing disk rotation, terminating said series of bursts of alternating current pulses and switch control of the actuator voice coil motor to the device operational control sequence.

6. The method of claim 5 wherein said varying frequency of pulses includes the resonant frequencies of at least two modes of disk vibration.

7. The method of claim 6 wherein the pulse frequency within each burst of pulses begins with the lowest frequency and progressively increases to the highest frequency pulse.

8. The method of claim 5 wherein the step of sensing the start of disk rotation comprises applying a low sensing current to the spindle motor and sensing the onset of a back electromotive force in the spindle motor windings indicating rotation has begun.

9. In a disk drive having at least one rotatable storage disk, a disk drive motor connected for rotation of said at least one disk, a radially movable actuator driven by an actuator motor and a plurality of read write heads attached to the actuator and wherein said heads include bearing surfaces that are supported on a film of fluid above the disk surface when the disk is rotating at its operating speed and can contact the surface of the disk when the disk is at rest, comprising:

first current supply means for delivering a current to said drive motor which is sufficient to overcome drag and rotate said at least one disk when no head is adhered to the confronting disk surface;

actuator current supply means for energizing said actuator motor with an initial burst of alternating current pulses and a subsequent burst of alternating current pulses, the initial and subsequent bursts of alternating current pulses differing in energy level, each pulse burst including a series of alternating current pulses, wherein said actuator current supply means applies alternating current pulses of varying frequency during each burst of pulses;

sensing means for sensing rotation of said at least one disk; and control means, responsive to said sensing means sensing rotation of said at least one disk, for terminating said actuator current supply means.

10. A method for starting disk rotation of a disk drive data storage device which has a rotatable data storage disk driven by a spindle motor; a transducer carrying head for reading data from and writing data on the disk; and an actuator, driven by an actuator motor, attached to the head for moving the head over the disk surface; wherein the head can contact the disk surface when the disk is at rest and rides on a bearing of fluid which separates the head and disk when the disk rotates at its operational speed, the method comprising the steps of:

applying a current to the spindle motor which is sufficient to overcome disk inertia and head drag if stiction is not present;

sensing the presence or absence of back electromotive force in the spindle motor wherein the presence of a back electromotive force indicates disk rotation has begun;

applying a sequence of bursts of alternating current pulses to the actuator motor, responsive to the sensing of the absence of a back electromotive force, said bursts differing in energy level, each pulse burst including a series of alternating current pulses, wherein the step of applying a sequence of bursts of alternating current pulses comprises the application of a varying frequency of pulses within each burst; and switching the actuator motor to operational control responsive to the sensing of a back electromotive force by terminating the burst sequence to the actuator motor.

* * * * *